Sept. 29, 1959 R. J. STIRTON ET AL 2,907,028
APPARATUS FOR TRAJECTORY DETERMINATION
Filed Feb. 20, 1953 2 Sheets-Sheet 1
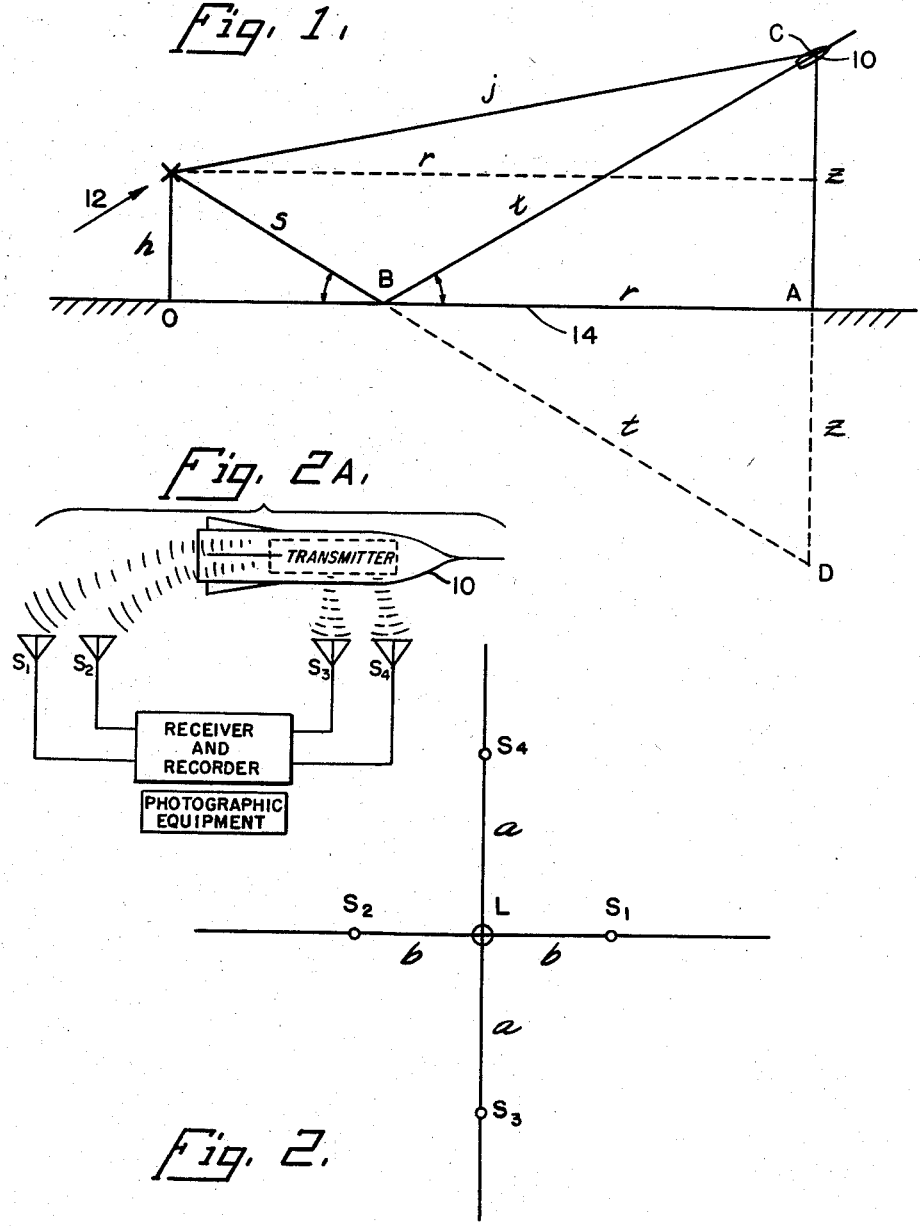
INVENTORS
ROBERT J. STIRTON
GEORGE LEITMANN
BY
ATTORNEYS

United States Patent Office 2,907,028
Patented Sept. 29, 1959

2,907,028
APPARATUS FOR TRAJECTORY DETERMINATION

Robert J. Stirton and George Leitmann, China Lake, Calif., assignors to the United States of America as represented by the Secretary of the Navy Application February 20, 1953, Serial No. 338,176

3 Claims. (Cl. 343—112)

(Granted under Title 35, U.S. Code (1952), sec. 266)

The invention described herein may be manufactured and used by or for the Government of the United States of America for governmental purposes without the payment of any royalties thereon or therefor.

This invention relates to the problem of determining the trajectory of a missile in space and more particularly to methods and apparatus by which the trajectory of a missile may be obtained.

In the testing and development of missiles, rockets, and the like, it is necessary to determine how the trajectories vary with changes in parameters such as the shape of the missile, the arrangement of its control surfaces, and guidance means of the missile.

It has been the practice up to now to rely primarily on either optical or radar techniques for determining the trajectories of missiles. The optical means rely upon photographing the missile by a plurality of camera theodolites. There is, of course, a limit as to the range, particularly under adverse weather conditions, that optical systems will provide adequately precise data. Also camera theodolites are relatively expensive pieces of apparatus. Radar techniques are not as adversely affected by weather as optical means, but the ground installations are expensive and normally require the missile, whose trajectory is to be determined, to carry transponder equipment which is bulky and expensive.

It is an object of this invention to provide methods and apparatus for determining the trajectories of missiles in space.

It is a further object of this invention to provide methods and apparatus for determining the trajectories of missiles in space which does not limit the length of the trajectory and is relatively inexpensive.

It is still a further object of this invention to provide methods and apparatus for determining the trajectories of missiles in space which use the interference phenomena between electromagnetic radiation which travels directly from the missile to a plurality of spaced receivers and radiation which is reflected to said receivers.

Other objects and many of the attendant advantages of this invention will be readily appreciated as the same becomes better understood by reference to the following detailed description when considered in connection with the accompanying drawings wherein:

Fig. 1 is a diagrammatic view illustrating the method and apparatus comprising the invention;

Fig. 2 is a diagrammatic plan view illustrating a preferred arrangement of the location of receivers;

Fig. 2A is a block diagram illustrating the antennae as located in Fig. 2, as well as receiver, transmitter and photographic equipment;

Referring to Fig. 1, missile 10 has located therein a radio transmitter which is adapted to transmit a signal of substantially constant frequency and amplitude. Located at some fixed point in space is the receiving antenna 12 of a conventional receiver that is not illustrated. The antenna 12 is located at a fixed distance $h$ above the preferably substantially flat reflecting surface 14 which may be a flat portion of the ground, or the surface of a body of water.

Figure 3:
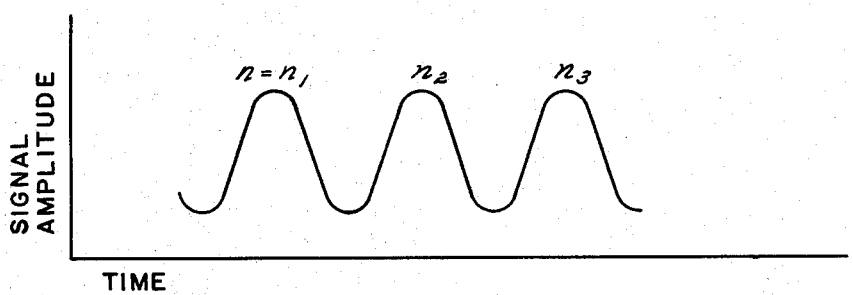
Fig. 3 is a graph illustrating the variation of the intensity of radiation as received at a receiving station with respect to time.

The method and apparatus comprising the invention relies upon the phenomenon of interference between electromagnetic radiation transmitted directly to antenna 12 along path $j$ and the electromagnetic radiation that is reflected from surface 14 and travels along paths $s$ and $t$. Constructive interference occurs between these two components of radiation whenever the direct and reflected waves arrive in phase at antenna 12 so that they reinforce each other; whenever they arrive $\pi$ radians out of phase they cancel each other out partially. The strength of the signal recorded by the receiver associated with antenna 12 is a simple interference pattern such as is shown in Fig. 3. When the signal strength is recorded against time, the order of interference either constructive or destructive, can be obtained as a function of time. So long as the irregularities in reflecting surface 14 are smaller than the wave length of the radiation employed, it can be assumed that specular reflection takes place at surface 14.

If the origin "O" of a system of rectangular space coordinates is located at the point that the vertical from antenna 12 strikes reflecting surface 14, and if the $x$, $y$ coordinates lie in the plane of the reflecting surface, then the heights above the plane 14 of the antenna 12 and missile 10 is the $z$ coordinates of each of said points. If $r$ is the distance along surface 14 from antenna 12 to missile 10, then (1) $$r^2 = x^2 + y^2$$

where $x$ and $y$ are the $x$ and $y$ coordinates of the missile.
$h$ is the height of antenna 12,
$j$ is the path length of the direct wave from missile 10 to antenna 12,
$s+t$ = path length of the reflected wave, and
$\lambda$ = wave length of the electromagnetic radiation transmitted from missile 10.

The reflected wave undergoes a phase shift of $\pi$ radians ($\lambda/2$) upon reflection from the ground. Thus reinforcement occurs whenever (2) $$s+t-j = (n-\tfrac{1}{2})\lambda$$

where $n$ is called the order of the constructive interference; $n$ being an integer.

(3) $$(s+t)^2 = (z+h)^2 + r^2$$

since triangles ABC and ABD are congruent. Also (4) $$j^2 = (z-h)^2 + r^2$$

Substituting $x^2+y^2=r^2$ for $r^2$ and solving for $z$ yields.

(5) $$z = \frac{\alpha}{2}\left[1 + \frac{4}{m^2}(x^2+y^2)\right]^{1/2}$$

where (6) $$\alpha = (n-\tfrac{1}{2})\lambda$$

and $n$ is the order of constructive interference and (7) $$m^2 = 4h^2 - \alpha^2$$

Thus there can be obtained from the record of the variation of the intensity of the signal with time received at the receiver the equation of a hyperboloid upon which the missile must lie. To determine the position of a missile in space it is necessary to obtain the intersection of three hyperboloids, i.e., use three receivers located at three different fixed loci, or places, so that three equations of the form (8) $$z^2 = A_k x^2_k + B_k y^2_k + C_k$$

for values of $k = 1, 2$ and $3$, where (9) $$A_k = B_k = \left(\frac{\alpha_k}{m_k}\right)^2$$

and

(10) $$C_k = \left(\frac{\alpha_k}{2}\right)^2$$

may be solved simultaneously.

Equation 6 defines $\alpha = (n - \frac{1}{2})\lambda$ where $n$ is the order of constructive interference. When constructive interference occurs, the direct and reflected waves arrive at the antenna in a manner such that they differ by an integral number of wave lengths $n$. Here

(11) $$n = (n - \frac{1}{2}) + \frac{1}{2}$$

Where $n - \frac{1}{2}$ is due to the difference in path length and $\frac{1}{2}$ is due to phase reversal upon reflection. The first recorded interference maximum (or minimum) is not necessarily of order zero. Initial orders of interference may not be recorded because they may be masked by noise. To determine the order of the first recorded interference maximum or minimum it is necessary to know the position of the missile in its trajectory at a known time. This can be accomplished by photographing the initial period of missile flight. Photographic records of the early portion of the missile flight are made with either fixed cameras, such as the Bowen camera for example, or tracking cameras, such as the Askania Cinetheodolite for example. Standard photogrammetric reduction procedures are then used to provide position of the missile in space as a function of time. A discussion of such standard procedures may be found in U.S. Navy publications: "A Method for the Reduction of Trajectory Data from CZR-1 and RC-2 Bowen Ribbon-Frame Cameras," by John Titus and Amy E. Griffin, NAVORD Report 1967, USNOTS, China Lake, Calif., April 30, 1952; and "Methods of Measurement and Computation to Determine Trajectory Data from Askania Cinetheodolite Records" by John Titus, Mary Driggers and Laurence Minvielle, NAVORD Report 1907, USNOTS, China Lake, Calif., September 10, 1951. The recordings of interference are made with a time base which is common to both interference and photographic recordings. This then provides position in space and the interference record as a function of a common time; correlation is made through this common time base. Timing and reduction of various metric photographic records are standard experimental techniques known at all missile testing ranges as is timing on the recorder used to make the interference record. Then

(12) $$n_1 = \frac{s_1 + t_1 - j_1}{\lambda} + \frac{1}{2}$$

From this equation the order $n_1$ of the first reinforcement recorded is established.

Figure 4:
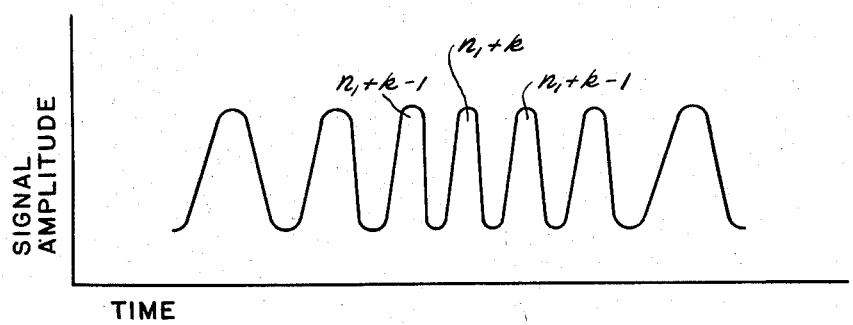
Fig. 4 is a graph illustrating the variations of the order of interference (constructive and destructive) as received at a receiving station with respect to time.
Figure 5:
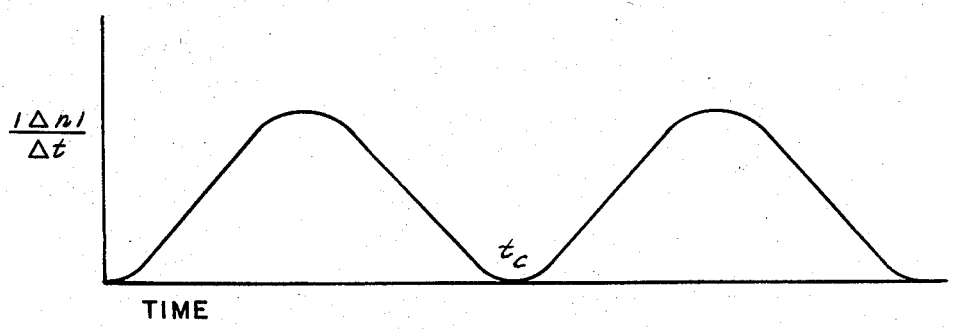
Fig. 5 is a graph of the rate of change the absolute values of the order of interference (constructive and destructive) with respect to time.

It should be noted that $n$ does not increase monotonically but that it reaches a maximum at some point of the trajectory and thence decreases again as shown in Fig. 4. To determine the order of $n$ at the point where $n$ changes from an increasing to a decreasing function $|\Delta n|/\Delta t$ may be plotted as a function of time as shown in Fig. 5. The time $t_c$ at which $|\Delta n|/\Delta t$ vanishes is the time where $n$ changes from an increasing to a decreasing quantity and hence yields the value of $n$ at this point. A further check on the accuracy of the determination of the critical value of $n$ may be made by comparing the computed range of the missile with the actual range, if it is known.

A second set of points of the trajectory may be obtained by utilizing destructive interferences. Referring to Equation 5, if

(13) $$\alpha = n\lambda$$

where $n$ is any integer destructive interference occurs, and $n$ is now called the order of destructive interference.

In order to obtain precise measurements, it is desirable that the hyperboloids intersect as nearly orthogonally as is possible. The arrangement of antennae illustrated in Fig. 2 and Fig. 2A is a preferred arrangement, if four antennae $S_1$, $S_2$, $S_3$ and $S_4$ are used. L is the location from which the missile is launched in a direction toward $S_4$. Antennae $S_3$ and $S_4$ are located at a distance "$a$" from the point L where "$a$" is equal to one half the anticipated range of the missile. Antennae $S_1$ and $S_2$ as located on a line at right angles to the expected trajectory through point L and at a distance "$b$" from the point L where "$b$" has a suitable value. There is, of course, no limit as to the number of receiving stations and their location. Any number and arrangement that will provide sufficiently accurate data for the purpose intended is all that is necessary. The minimum number of receiving stations is, however, three.

It is, of course, obvious that the plots of signal intensity vs. time as illustrated in Fig. 3 will not be in phase at all receiving stations. However, this does not unduly complicate the computations since the values of $n$ as used in Equation 6, do not have to be integers.

In arriving at Equation 8, the origin of the coordinate system was assumed to be located at the base of the antenna 12. In computing the trajectory it may be desirable to locate the origin at the launching point or any suitable place. To accomplish this, Equation 8 could be changed by a simple transformation of coordinates, as is well known, to locate the origin at any desired place.

Obviously many modifications and variations of the present invention are possible in the light of the above teachings. It is therefore to be understood that within the scope of the appended claims the invention may be practiced otherwise than as specifically described.

What is claimed is:

1. Apparatus for determining the trajectory of a missile traveling through space which comprises means for constantly transmitting an electromagnetic signal from the missile during the missile flight, means for constantly receiving the direct and reflected radiation portions of said signal from the transmitting means in said missile at each of at least three different fixed loci, means for continuously recording the strength of said electromagnetic signal with respect to time, and said apparatus including photographic means responsive to signals from said apparatus for determining at least one reference point of the trajectory at a known time during the initial period of missile flight when a first interference signal is recorded by said signal recording means.

2. Apparatus in accordance with claim 1 wherein said means for transmitting an electromagnetic signal from the missile, comprising a radio transmitter which transmits a signal of substantially constant frequency and amplitude.

3. Apparatus in accordance with claim 1 wherein one of the loci is located along the trajectory at a distance substantially equal to one-half the range of the missile.

References Cited in the file of this patent

UNITED STATES PATENTS

| | | |
|---|---|---|
| 1,406,996 | Morrill | Feb. 21, 1922 |
| 2,086,742 | Scharlau | July 13, 1937 |
| 2,134,535 | Runge | Oct. 25, 1938 |
| 2,406,953 | Lewis | Sept. 3, 1946 |
| 2,413,620 | Guanella | Dec. 31, 1946 |
| 2,448,587 | Green | Sept. 7, 1948 |
| 2,500,186 | Kline | Mar. 14, 1950 |
| 2,515,332 | Budenbom | July 18, 1950 |
| 2,586,783 | Busignies | Feb. 26, 1952 |
| 2,628,836 | Gangel | Feb. 17, 1953 |